United States Patent [19]

Bickham

[11] 4,431,339

[45] Feb. 14, 1984

[54] UNDER ICE OIL BARRIER

[75] Inventor: Kenneth L. Bickham, Spring, Tex.

[73] Assignee: Shell Oil Company, Houston, Tex.

[21] Appl. No.: 336,110

[22] Filed: Dec. 30, 1981

Related U.S. Application Data

[63] Continuation of Ser. No. 118,938, Feb. 6, 1980, abandoned.

[51] Int. Cl.³ .............................................. E02B 15/04
[52] U.S. Cl. ...................................... 405/68; 210/923; 405/61; 405/65
[58] Field of Search ...................... 405/60, 61, 63, 64, 405/65, 66, 68, 69, 217; 210/242.1, 242.3, 923

[56] References Cited

U.S. PATENT DOCUMENTS

| | | | |
|---|---|---|---|
| 3,230,967 | 1/1966 | Castro | 405/68 X |
| 3,503,508 | 3/1970 | Desty et al. | 405/68 X |
| 4,039,454 | 8/1977 | Miller et al. | 210/DIG. 25 X |
| 4,199,273 | 4/1980 | Mougins | 405/61 X |
| 4,245,930 | 1/1981 | Gefvert | 405/217 |

FOREIGN PATENT DOCUMENTS

| | | | |
|---|---|---|---|
| 1556930 | 12/1979 | United Kingdom | 405/63 |
| 628219 | 10/1978 | U.S.S.R. | 405/61 |

*Primary Examiner*—David H. Corbin

[57] ABSTRACT

A method and apparatus are provided for containing and collecting oil spilled under ice over water having a current by deploying a buoyant boom or barrier under the ice downstream of the oil spill and crossing the current flow, and stopping the flow of the oil with the boom or barrier. Preferably, the boom or barrier is constructed of two tubes connected by a spreader which are inflatable in situ under the ice and which form a water space above the spreader and between the tubes which subsequently freezes to anchor the boom or barrier in place.

9 Claims, 2 Drawing Figures

UNDER ICE OIL BARRIER

This is a continuation of application Ser. No. 118938 filed Feb. 6, 1980 now abandoned.

BACKGROUND OF THE INVENTION

Spilled-oil containment under ice is a problem that may occur along arctic transportation routes over the next several years. In regions where first-year ice is land fast and there exists a slight, under-ice spilled oil may widely spread and become essentially unrecoverable due to the overlying ice. As the oil freezes into the ice, it becomes resistant to natural deterioration but persists as a potential source of pollution. In the delicate environment of the arctic regions, such a spill obviously can potentially cause ecological damage which could take years to mend. Accordingly, it is essential to provide some sort of method and means to contain or divert oil spilled under an ice cover.

SUMMARY OF THE INVENTION

The present invention provides a method for containing oil spilled under ice over water having a current by deploying a buoyant boom or barrier under the ice, downstream of the oil spill and crossing the current flow and stopping flow of the oil with the boom or barrier. The method of the invention further includes recovering the spilled oil through at least one hole in the ice at a location along the boom or barrier where the oil has collected. The boom or barrier is positioned by deploying at least one deflated tube under the ice and then inflating the tube to form the buoyant boom or barrier.

The apparatus of the present invention is a boom or barrier for containment of oil spilled under ice over water having a current which includes at least two buoyant tubes connected by a spreader which maintains the parallel relationship of the tubes. The tubes and spreader are inflatable in situ under the ice and provide a water space which is located over the spreader and under the ice and between the tubes. The water in this space is almost completely insulated from the water below which is slightly warmer than the ice; thus, the ice growth rate in this space is higher than in the surroundings. When the water in the space freezes, it anchors the boom or barrier in place.

DESCRIPTION OF PREFERRED EMBODIMENTS

The occurrence of oil spills under ice in arctic regions will become increasingly probable because of increased activity in the future. In such regions where the first-year ice is land fast and there exists a slight, under-ice current, the present invention provides means for containing and diverting oil spilled under the ice cover.

Figure 1:
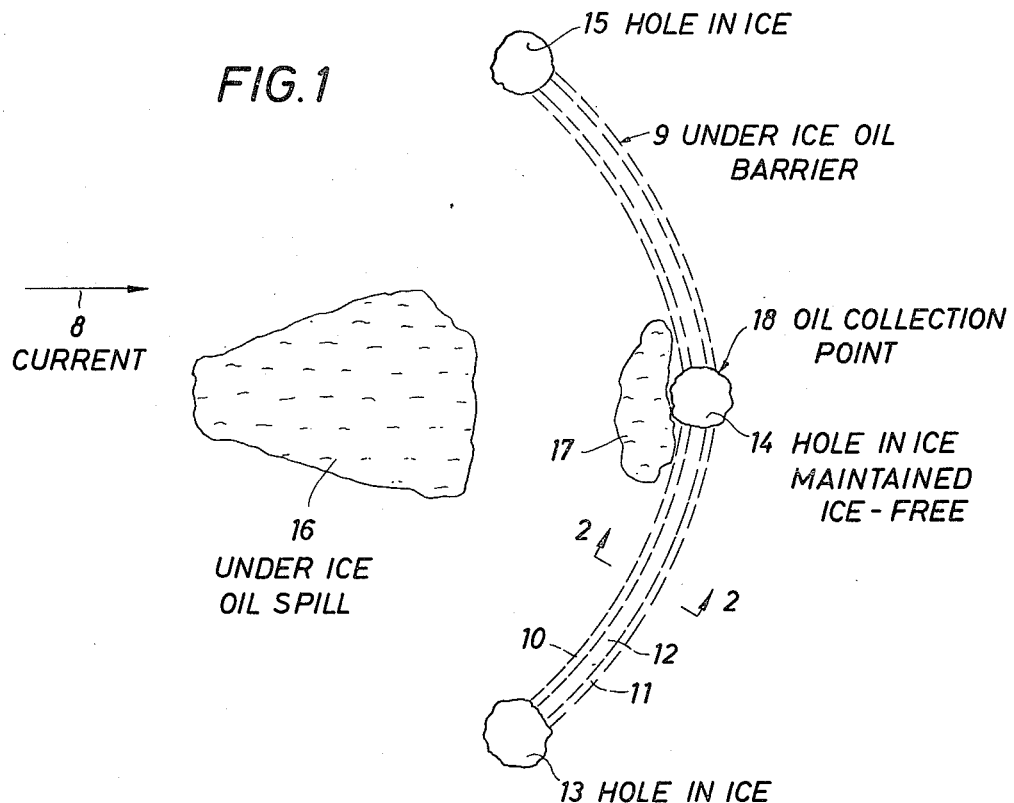
FIG. 1 is a plan view of a deployment scheme for an under ice oil barrier.

The present invention is an easily stored, transported and deployed barrier that is inflated with air or any other gas such as exhaust gas from specially adapted engine. As shown in FIG. 1 of the drawings, the boom 9 of the present invention has three primary elements in its construction, two of which are tubes 10 and 11, possibly 50 to 100 feet long which are inflatable, for example 21 to 36 inches in diameter and connected by a spreader 12. To install this barrier under ice, holes 13, 14 and 15 are cut in the ice with a chain saw, for example, or other equipment at suitable intervals. A line (not shown) is fished under the ice between adjacent holes, and the barrier 9 is pulled into position using the line. Before inflation with air or another gas, the barrier 9 is held in position by its ends at each hole 13, 14 or 15. After inflation, the buoyant force and other factors mentioned hereinafter hold the barrier 9 in position until such time as an oil spill 16 or 17, moving with current 8, approaches the area between holes 13 and 15 and is diverted by the barrier toward hole 14 where it is withdrawn at an oil collection point 18.

Figure 2:
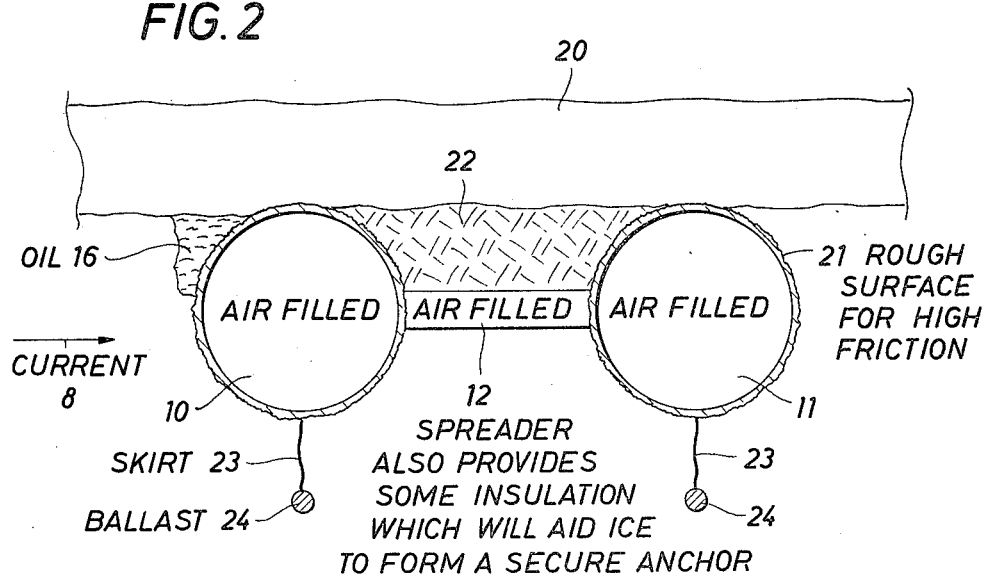
FIG. 2 is a cross sectional view of the oil barrier of FIG. 1.

A cross section of the oil barrier 9 is shown in FIG. 2. Barrier 9 is constructed of tubes 10 and 11 which are inflated and connected by inflated spreader 12 and situated under ice 20. The tubes 11 and 12 have a roughened surface 21 which, in addition to the buoyancy of the barrier, serves to hold the barrier in place until water trapped above the spreader 12 and between the tubes 10 and 11 freezes to form ice 22 which anchors the barrier 9 in place. Oil 16 is trapped at the edge of barrier 9 and is prevented from under-flowing the barrier by skirts 23 which depend from the bottom of each tube 10 and 11 and are held vertically by ballast 24. Skirts 23 provide means for directing trapped oil to the oil collection point 18 and for preventing the escape of an especially thick layer of oil which has collected at the barrier.

What is claimed is:

1. A method for containing oil spilled under ice which is at the surface of water having a current relative to the ice, comprising deploying a buoyant boom under the ice, downstream of the oil spill, and crossing the current flow and stopping flow of the oil with the boom.

2. The method of claim 1 including recovering the spilled oil through at least one hole in the ice at a location along the boom where the oil has collected.

3. The method of claim 1 including deploying at least one deflated tube under the ice, and inflating the tube to form the buoyant boom.

4. A boom for containment of oil spilled under ice over water having a current comprising at least two buoyant tubes connected by a buoyant spreader which holds the tubes in a spread-apart relationship, the tubes and spreader forming an ice anchor therebetween which is attached to the ice and operative to prevent movement of the boom by the current.

5. The boom of claim 4 wherein the tubes have roughened surface.

6. The boom of claim 4 wherein each tube has a depending skirt.

7. The boom of claim 6 wherein each skirt is provided with ballast.

8. A method for containing oil spilled under land-fast ice which is at the surface of water having a current, comprising, forming at least two holes completely through the ice, passing a line under the ice between the holes, pulling at least one deflated tube under the ice with the line into position between the holes and across the current flow, inflating the deflated tube, and stopping flow of oil with the inflated tube.

9. A method for containing oil spilled under land-fast ice which is at the surface of water having a current, comprising, forming at least two holes completely through the ice, passing a line under the ice between the holes, pulling with the line at least two deflated tubes and a spreader connecting the tubes into position between the holes and across the current flow, inflating the deflated tubes and spreader, and stopping the flow of oil with the inflated tubes and spreader.

* * * * *